United States Patent [19]

Hirai et al.

[11] 4,028,284

[45] * June 7, 1977

[54] PHENOLIC CHELATE RESIN

[75] Inventors: Masahide Hirai, Uji; Mikio Fujimura, Kamo; Masahiro Kazigase; Minoru Saito, both of Uji, all of Japan

[73] Assignee: Unitika Ltd., Amagasaki, Japan

[ * ] Notice: The portion of the term of this patent subsequent to Feb. 3, 1993, has been disclaimed.

[22] Filed: Sept. 11, 1975

[21] Appl. No.: 612,523

Related U.S. Application Data

[63] Continuation-in-part of Ser. No. 435,126, Jan. 21, 1974, Pat. No. 3,936,399.

[30] Foreign Application Priority Data

Jan. 23, 1973 Japan .................................. 48-9793

[52] U.S. Cl. ............................ 260/2.2 C; 260/51.5; 260/54; 260/59 R

[51] Int. Cl.$^2$ ...................... C08G 14/06; C08J 5/20
[58] Field of Search ................. 260/2.2 C, 51.5, 54, 260/59 R

[56] References Cited

UNITED STATES PATENTS 3,936,399  2/1976  Hirai et al. ..................... 260/2.2 C

*Primary Examiner*—Melvyn I. Marquis
*Assistant Examiner*—H. H. Fletcher
*Attorney, Agent, or Firm*—Sughrue, Rothwell, Mion, Zinn & Macpeak

[57] ABSTRACT

A high adsorption capacity phenolic chelate resin consisting of a heavy metal-adsorbing phenolic chelate resin, containing iminodiacetic acid groups in the phenol nuclei, and having an adsorbability to a heavy metal in the proportion of at least 1.2 m equivalent per g of dried terminal Na type resin, said phenolic chelate resin being prepared from phenols, aldehydes and iminodiacetic acid.

7 Claims, No Drawings

PHENOLIC CHELATE RESIN

CROSS-REFERENCE TO RELATED APPLICATION

This application is a Continuation-In-Part Application of application Ser. No. 435,126, filed Jan. 21, 1974, now U.S. Pat. 3,936,399.

BACKGROUND OF THE INVENTION

1. Field of the Invention

The present invention relates to a phenolic chelate resin having a selective adsorbability to a heavy metal using a phenol, an aldehyde, and iminodiacetic acid.

More particularly, the present invention relates to a high adsorption capacity phenolic chelate resin having an adsorbability to a heavy metal in the proportion of at least 1.2 m equivalent per g. of dried terminal Na type resin.

2. Description of the Prior Art

Materials such as iminodiacetic acid which are capable of forming chelate compounds by coordination with heavy metal ions are well known and research on metal chelation has now been extended to various fields such as organic reagents for inorganic analytical chemistry, chelate titration, solvent extraction of metal ions, complex salt dyes, chelate pigments, and blocking agents for metal ions for use in the chemical industry. As amino acid type chelating compounds, there have been known various kinds of ethylene diamine tetracetic acid, trinitroacetic acid and the like other than the above iminodiacetic acid. Phenolic compounds substituted with iminodiacetic acid are also disclosed in Sallmman et al patent (U.S. Pat. No. 2,763,680).

However, the amino acid type low molecular chelate compounds tend to react with a metal, and are generally easily soluble in water. Especially, acids wherein the terminal group is neutralized with sodium are completely soluble in water. Therefore, the low molecular chelate compounds are not useful as one of the countermeasures for the pollution through the practical removal of heavy metals from drainage contaminated with heavy metals. Accordingly, there have already been made various trials for using the low molecular chelate compounds as an adsorbent for heavy metals by introducing a chelate group into a mother high molecular resin, which is obtained by converting the low molecular weight chelate compound into a water-insoluble and three-dimensional form, or for treating the chelate compound containing chelate group so as to make a three-dimensional marcromolecular form.

However, the introduction of a chelate group into a high molecular mother resin in a three-dimensional form, for example, the reaction of a phenolic resin with iminodiacetic acid and formaldehyde, is very difficult resulting in recovery of the greater part of iminodiacetic acid and reduction of the heavy metal-adsorbing property in the resin product to below 0.3 equivalent/g.

Since, in the latter case, the conventional procedure has various defects such as a low yield in the introduction into the aromatic ring of said iminodiacetic acid during the practical preparation thereof, and an insufficient regulation in the position of substitution within the aromatic ring of the iminodiacetic acid to be introduced or in the number of the iminodiacetic acid groups to be introduced into one aromatic ring, the successive macromolecule- forming and cross-linking step thereof cannot sufficiently be effected, thereby obtaining only a resin having an adsorbability to a heavy metal in the proportion of 0.3 to 0.8 m equivalent per g. of dried chelate resin but not a resin having an adsorbability in the proportion of at least 1.2 m equivalent, preferably 1.4 to 1.5 m equivalent which may be required from the commercial standpoint.

However, the kinds of commercially available chelate resins are very few since the chelating groups introduced into high molecular weight materials are generally poor in chemical stability as compared with ordinary ion-exchange groups such as a sulfonic group, a carboxyl group, and a quaternary ammonium group. This makes the reuse of such chelate resins difficult, the cost of the chelating group itself is high, and the procedure of introducing the chelating groups into high molecular weight materials is comparatively complicated, which results in greatly increasing the cost of the chelate resins as compared with ordinary ion-exchange resins.

SUMMARY OF THE INVENTION

As the results of various investigations on discovering a chelate resin having excellent selective adsorbability to heavy metals by introducing as side chains of synthetic high polymer compounds which have a chelating effect, which are chemically stable, and which are comparatively inexpensive, the inventors have succeeded in discovering the resin.

That is, the present inventors have succeeded in preparing a resin comprising a phenolic chelate resin having selectivity to heavy metals and an adsorbability to a heavy metal in the proportion of at least 1.2 m equivalent per g. of dried terminal Na type resin.

An object of this invention is, therefore, to provide a phenolic resin having excellent selective adsorbability to heavy metals and capable of being reused repeatedly.

DETAILED DESCRIPTION OF THE INVENTION

The present invention relates to a high adsorption capacity phenolic chelate resin consisting of a heavy metal-adsorbing phenolic chelate resin, having partially iminodiacetic acid groups in the phenol nucleus and having an adsorbability to a heavy metal in the proportion of at least 1.2 m equivalent per g. of dried terminal Na type resin, said phenolic chelate resin being prepared from phenols, aldehydes and iminodiacetic acid.

Iminodiacetic acid used in the present invention can be prepared from inexpensive raw materials such as ammonia, hydrogen cyanide, formaldehyde, etc. The iminodiacetic acid contains the moiety —N—CH$_2$—COOH as contained in a low molecular weight chelating agent industrially produced such as ethylene diaminetetraacetic acid or nitrilotriacetic acid and exhibits quite excellent chemical stability as compared with other chelating agents.

The practical preparation of the resin of the present invention can be conducted by the following procedure. For example, an aqueous acid mixture of phenols, aldehydes and iminodiacetic acid is heated to 20° to 90° C, preferably 40° C to 60° C to suspend uniformly the iminodiacetic acid, and then the mixture is maintained at 20° C to 90° C, preferably 40° C to 60° C to effect Mannich's reaction thereof to thereby introduce the iminodiacetic acid into phenols. When this reaction as the first step has been finished, the second step, polycondensation reaction, is effectively conducted by adding phenols and/or aldehydes thereto after completion of the above first step reaction, elevating gradually the reaction temperature to 50° C to 90° C, to obtain a resin having as uniform a composition as possible, and finally maintaining the reaction system at a temperature of 90° C to 110° C. In the above reaction, the molar ratio of the phenol, the aldehyde and the iminodiacetic acid employed can be selected in such a manner that the iminodiacetic acid is used in a molar ratio of 0.1 0.9 , preferably 0.3 to 0.6 to the total phenol and that the molar ratio of the aldehyde to the total phenol is 0.5 to 2.0, preferably 0.7 to 1.5 .

The reaction of introducing iminodiacetic acid into a low molecular weight aromatic ring having a phenolic hydroxyl group has long been known since Schwarzenbach prepared a metal indicator by introducing an iminodiacetic acid group as a chelate-forming group into a phthaleinic dye or a sulfophthaleinic dye.

However, in producing a high molecular material after introducing iminodiacetic acid, the yield in the introduction of iminodiacetic acid becomes low and further if the positions of the aromatic ring to which iminodiacetic acid groups introduced into the aromatic ring are not sufficiently controlled, the subsequent polymerization and cross-linking cannot be sufficiently conducted resulting in only a resin having a low metal adsorbability or resulting in a resin which does not have a durable strength in practical use.

A feature of this invention, on the other hand, lies in the discovery of a process of producing a phenolic chelate resin capable of being used repeatedly and having excellent metal adsorbability, which have never been attained in conventional phenolic chelate resins by controlling the introduction of iminodiacetic acid groups into an aromatic ring so that the subsequent polymerization reaction can proceed easily.

In the case of conduction the aforesaid first step Mannich reaction, a protonic acid, e.g., a mineral acid such as hydrochloric acid, sulfuric acid, etc.; an organic acid such as formic acid, oxalic acid, etc.; and an aromatic sulfonic acid such as benzenesulfonic acid can be used as a reaction promotor in a molar ratio 0.1 to 3.0 to the iminodiacetic acid.

In the first step reaction, the acid mixture of phenols, aldehydes and iminodiacetic acid can also be reacted in the form of a uniform solution system using an acid catalyst such as mineral acid, an organic acid or the like.

In addition, the second step polycondensation reaction is conducted in the presence of either the above protonic acid in the above amount such as sulfuric acid, hydrochloric acid, p-toluenesulfonic acid or the like, or an alkali in a motor ratio 2.1 to 4.0 to the iminodiacetic acid can be used. Suitable examples of the alkali which can be used in the second reaction step include an alkali metal hydroxide such as sodium hydroxide, potassium hydroxide, etc.; ammonia; an amine such as trimethylamine, triethylamine, etc; or a nitrogen-containing basic compound such as pyridine, etc.; or a mixture thereof.

The reaction solution is suspended in the medium while said reaction solution is in fluidity during the polycondensation reaction. Furthermore, the polycondensation can be effected with stirring to synthesize a bead-like cross-linked chelate resin. According to said pellet-forming procedure, it is possible to prepare a pellet-like resin having less than 2 mm in diameter.

As the suspending medium for the pellet-forming procedure, there may be used any one which can form an azeotropic compound with water and is inert to the poly-condensation reaction. From the standpoint of the industrial operation, it is desirable to select one which is noncombustible, flame-resistant, less compatible with water and inexpensive but has a large specific gravity. For example, there are embodied halogenated hydrocarbons such as carbon tetrachloride, chloroform, methane dichloride, trichloroethylene, 1,2-dichloroethane, 1 -bromoethane, 1-chloro-2-methylpropane, 1-chloropentane, chlorbenzene, 1-chloro-2-methyl-1-propene, 1-chlorobutane, etc., halogenated ether and saturated or unsaturated hydrocarbons.

In general, the pellet-like resin is superior to a granular resin in view of the operatibility when using for an ion-exchange column. Especially it is characterized by a lower pressure loss in passing thereof through the column and less impingment abrasion between the resins. Therefore, the greater part of commercially available ion-exchange resins are bead-like resins and only a part of granular resin is employed for special use.

As phenol resins, a resole-type resin which is cured by heat-treatment only as disclosed in U.S. Pat. No. 3,650,102 and a novolak-type resin which requires an addition of an aldehyde as disclosed in U.S. Pat. No. 2,190,672, etc. are well known. In the process of this invention a resole-type phenolic chelate resin or a novelak-type phenolic chelate resin can be produced by controlling or changing the molar ratio of the aldehyde and the phenol (hereinafter, the ration is called "A/P").

That is, in order to obtain a resole-type phenolic chelate resin which can be cured by heat treatment only, it is necessary that the A/P ratio be in the range of 1.1 to 1.5 and in order to produce a novolak-type phenolic chelate resin which requires a cross-linking treatment other than by a heat treatment, it is necessary that the A/P ratio be in the range of 0.7 to 1.1. Therefore, the ratio A/P in the conditions of the production of phenol resins in general has the same significance as in the A/P ratio in the production of the phenolic chelate resins of this invention. However, in the case of producing the phenolic chelate resins of this invention from a phenol, an aldehyde, and iminodiacetic acid, it is as a matter of course necessary that the aldehyde which may be used in an amount equimolar to the iminodiacetic acid in the above Mannich reaction be used in excess in the entire process of this invention.

Also, when the novolak-type chelate resin of this invention is pulverized and mixed with a cross-linking agent such as hexamine, para-formaldehyde and furfural, the mixture can be used as a molding material and can be cross-linked by heating after molding.

Since the novolak-type phenolic chelate resin of this invention can be cured by cross-linking reaction after molding into various desired forms utilizing the thermoplastic property of the resin, the fields of utilization of the resin are very broad.

In conducting the cross-linking reaction by immersing the chelate resin composition in an aqueous aldehyde solution, it is preferably to add an acid such as hydrochloric acid, oxalic acid, etc., as a catalyst and to heat the system at a temperature of from room temperature to 90° C, preferably from 40° C to 90° C to increase the rate of the cross-linking reaction. The amount of the acid catalyst varies depending upon the type of acids and aldehydes employed.

On the other hand, the resole-type phenolic chelate resin of this invention can be readily cured in a desired shape by dissolving it in water, molding or fabricating the solution into the desired shape, and heating the molded or fabricated product. Of course, by simultaneously conducting the granulation and cross-linking reaction in a solvent in which the chelate resin is insoluble, a granular chelate resin can be formed.

From the above description it can be seen that the phenolic chelate resins of this invention have excellent moldability or fabricating properties and this is an important advantage of the chelate resin of this invention.

Examples of suitable phenols which can be used in this invention include phenol, alkyl-substituted phenols such as o-ethylphenol, m-ethylphenol, p-ethylphenol, p-phenylphenol, bisphenol A, o-cresol, m-cresol, p-cresol, 2,3-xylenol, 2,5-xylenol, 3,4-xylenol, 3,5-xylenol, etc., polyhydric phenols such as resorcinol, catechol, etc., and compounds having a phenolic hdyroxyl group such as $\alpha$-naphthol. The phenols can be used individually or as a mixture thereof.

Examples of suitable aldehydes which can be used in this invention include aldehyde derivatives such as formaldehyde, para-formaldehyde, hexamethylenetetramine, etc., aliphatic aldehydes such as acetaldehyde, propionaldehdyde, etc., aromatic aldehydes such as benzaldehyde, etc., and heterocyclic aldehydes such as furfural, etc. The aldehydes can also be used individually or as a mixture thereof.

Usually, the more the chelate group, iminodiacetic acid contained in the resin, the greater the adsorption capacity to a heavy metal becomes. However, a molar ratio of said iminodiacetic acid required is more than 0.2 based on total phenol from the standpoint of the adsorbability of the resin to a heavy metal. And, when the phenolic chelate resin according to the present invention is used as a resin to be recycled, it is desirable to use said iminodiacetic acid in the proportion of below 0.8 based on total phenol.

For producing the phenolic chelate resin having selective adsorbability to heavy metal ions from a phenol, an aldehyde, an iminodiacetic acid, a 5 to 90, preferably 20 to 70 wt% aqueous suspension of a mixture of the three components is heated to 20° to 90° C, preferably 40° to 60° C to uniformly suspend the iminodiacetic acid in the solution and thereafter the mixture is maintained at temperatures of 20° to 90° C, preferably 40° to 60° C for a period of 1 to 4, preferably 2 to 3 hours for the Mannich reaction to occur, whereby the iminodiacetic acid group is introduced into the phenol. This reaction is a first reaction step.

After the first step reaction is completed, the reaction system is subjected to a condensation reaction which is a second reaction step. In this case, the additional phenol or the aldehyde can be further added to the system in the condensation reaction step or both can be added.

To obtain a chelate resin having a composition as homogeneous as is possible, it is desirable to conduct the second reaction step at such temperature conditions that the reaction temperature is first controlled at 50° to 90° C and then the temperature is increased gradually. The temperature is finally maintained at 90° to 110° C and the reaction proceeds under refluxing. The reaction time generally required for this second step of the reaction is 1 to 6, preferably 2 to 4 hours. The condensation reaction in the second reaction step may be carried out in the presence of a solvent, e.g., carbontetra chloride, chloroform, trichloroethylene, chloral, dichloroethylene, 1,2-dichloroethane, 1,2-dichloropropane, chlorpbenzene, cyclohexane, cyclohexanol, toluene and the like in a volume of 0.01 to 5.0 times the volume of the reaction mixture.

In producing the resole-type or novolak-type phenolic chelate resin, it is desirable to add the phenol at the beginning of the reaction in the first step or the second step reaction. When the second step reaction proceeds until a desired condensation degree is obtained, the reaction product is dehydrated by heating it to about 90° to 110° C under a pressure of from a normal pressure to about 400 mmHg to provide a viscous resinous composition. If necessary, the resinous composition can be washed with fresh water.

In the conventional procedure comprising mix-heating iminodiacetic acid with aldehydes in one step to form a chelate resin, there can be obtained only a resin having an adsorption capacity of about 0.3 to about 0.8 m equivalent/g of dried Na type resin. However, the specific procedure according to the present invention makes it possible first to synthesize a phenolic chelate resin containing therein a large amount of chelate group and having an adsorption capacity of 1.2 m equivalent/g of dried Na type resin.

The adsorbability to heavy metal ions of the phenolic chelate resin for selectively adsorbing heavy metal ions prepared by the process of this invention differs depending on the manner of preparing the chelate resin but is generally almost 0.5 to 0.9 equivalent per one equivalent of the iminodiacetic acid group used.

The selectivity of the phenolic chelate resin of this invention to heavy metal ions depends upon the pH of the aqueous solution containing the heavy metal ions, the temperature of the solution, the kind and concentration of other ions present together with the heavy metal ions, etc. However, it has been confirmed that the selectivity thereof is generally in the order of mercury: copper lead: nickel: cadmium: zinc: cobalt: manganese: calcium: magnesium: barium: strontium: sodium, that is, with the selectivity to mercury being the highest.

For example, when three kinds of metal ions such as sodium ion, calcium ion, and cadmium ion are present in a solution in some concentrations, the phenolic chelate resin of this invention adsorbs selectively the cadmium ion only without changing the concentrations of the sodium ion and the calcium ion.

When the adsorbability in the phenolic chelate resin of the invention is saturated by adsorbing heavy metal ions therein, said resin is treated with an aqueous solution of a mineral acid such as hydrochloric acid or sulfuric acid thereby to effect both discharging of the heavy metal ions from said resin and elution thereof in the aqueous mineral acid solution.

Said resin free from the heavy metal ions can be employed as it is, but preferably used by further treating it with an aqueous solution containing an alkali such as, for example, sodium hydroxide, potassium hydroxide or the like.The regeneration can be conducted by a number of times, that is to say, the chelate resin can be used repeatedly a number of times by regeneration and in this case a reduction in neither adsorbability nor selectivity to the heavy metal ion is observed.

The above aqueous mineral acid solution may be from 1 to 5N.

Now, the invention will further be explained in detail by reference to the following examples. Unless otherwise indicated, all parts, percents, ratios and the like are by weight.

EXAMPLE 1

An aqueous solution of 37.6 parts of phenol, 26.6 parts of iminodiacetic acid, 16.2 parts of 37% formalin, and 80 parts of water was heated gradually from room temperature (about 20° to 30° C) to 70° C and after adding further to the solution 32.4 parts of 37% formalin while stirring the solution, the mixture was further stirred for 3 hours at a temperature of 90° to 95° C to continue the reaction. Then, after washing the reaction product, the reaction system was dehydrated under reduced pressure to provide 73 parts of a light yellow resin. The reaction product was pulverized and the resin powder thus obtained was cured for 2 hours using a hot blast dryer at 120° C. The resin powder thus heat-cured was immersed in a 1 to 5 N aqueous sodium hydroxide solution at 25° C, whereby the resin was converted to the sodium form.

When the resin was added to an aqueous solution of cadmium in an amount of 250 ppm and the mixture was shaken, the amount of cadmium adsorbed on the resin was 1.7 milliequivalents per g of the resin.

EXAMPLE 2

A mixture of 23.5 parts of phenol, 33.3 parts of iminodiacetic acid, 20.3 parts of 37% formalin, and 80 parts of water was heated to 70° C for 3 hours and after adding to the mixture 23.5 parts of phenol and 12.2 parts of 37% formalin, the reaction was further continued for 3 hours at 90° to 95° C. After the reaction was completed, the reaction product was dehydrated at 100° to 110° C. The resin thus obtained was pulverized, immersed overnight in a 1:1 mixture (by volume) of an aqueous 35% hydrochloric acid solution and an aqueous 37 % formalic solution, heated for 1 hour to 90° C, and then dried for 2 hours at 120° C. Thereafter, the resin was subjected to the alkali treatment as in Example 1. The adsorbability of the resin thus obtained for cadmium ion was 1.9 milliequivalent per gram of the resin.

EXAMPLE 3

A mixture of 47 parts of phenol, 67 parts of iminodiacetic acid, and 41 parts of 37% formalin was stirred for 3 hours at 70° C. After cooling the reaction product to 50° C, 51 parts of a 35% aqueous hydrochloric acid solution and 24 parts of 37% formalin were added to the reaction product and while maintaining the mixture at 50 ° C, the reaction was further continued for 8 hours. Furthermore, 23.5 parts of phenol was added to the mixture, the reaction temperature of the system was increased to 90° to 95° C, and then the condensation reaction was conducted for 2.5 hours at this temperature. When the pH of the reaction product was adjusted to 2 to 3 with 5 N aqueous sodium hydroxide solution, a viscous resin phase separated. The resin was recovered, washed with 80 parts of water, and then treated as in Example 1. The heavy metal ion adsorbability of the resin thus obtained was 2.2 milliequivalent of cadmium ion per gram of the resin.

EXAMPLE 4

A mixture of 28.5 parts of bisphenol A, 33.3 parts of iminodiacetic acid, 20.3 parts of 37% formalin, and 80 parts of water was reacted for 3 hours at 70° C. After adding further to the mixture 28.5 parts of bisphenol A and 12.2 parts of 37% formalin, the reaction was continued for 3 hours at 90° to 95° C. After the reaction was completed, the reaction product was dehydrated at 100° to 110° C. The resin thus obtained was pulverized, immersed overnight in a 1:1 mixture (by volume) of a 35% aqueous hydrochloric acid solution and 37 % aqueous formalin solution, heated for 1 hour at 90° C, and then heated further for 2 hours at 120° C. The heavy metal ion adsorbability of the resin thus obtained for cadmium ion was 1.4 milliequivalent per gram of the resin.

EXAMPLE 5

A mixture of 22.5 parts of iminodiacetic acid 15.7 parts of phenol, 16.2 parts of 37% aqueous formalin, and 4.7 parts of water was heated with stirring for 2 hours at 70° C. The temperature was reduced to 30° C, and after adding 41.7 parts of 35% aqueous hydrochloric acid thereto, the reaction system was mixed with 81.0 parts of 37 % aqueous formalin, 28.2 parts of phenol, and 4.7 parts of water with stirring, and continued to heat-stir for 1 hour at 50° C. Thereafter, the resultant system was cooled to room temperature. A mixed solvent system of carbon tetrachloride and monochlorobenzene was mixed with the above described resin solution and the procedure was continued to effect the suspension polycondensation for 3 hours while distilling off water under stirring at 120° C. The so produced resin was a pellet-like chelate resin of which adsorbability to heavy metal was 1.5 milliequivalent per gram of dried Na type resin.

EXAMPLE 6

The Na type resin obtained in Example 5 was immersed in water, and a column with a 13 mm diameter was filled with the resultant resin so that the resin level became 80 cm in height. Thereafter, a solution which had dissolved therein 120 mg/l of zinc in 10 % aqueous sodium sulfate was passed through the column for 10 hours in the proportion of 5 times per hour the amount of the resin filled by means of a quantitative pump. As the result, the leaking of zinc was less than 0.5 ppm. This fact shows both the possibility of adsorbing zinc in the co-presence of $Na^+$ at a high concentration and an excellent selective adsorbability of the chelate resin for heavy metals.

COMPARISON EXAMPLE 1

COMPARISON EXAMPLE FOR SYNTHESIZING HYDROXYBENZYL IMINODIACETIC ACID AT AN ALKALINITY 9.4 parts of phenol and 13.3 parts of iminodiacetic acid were placed in a three-necked flask and kept at a temperature of 60° to 70° C while stirring. Then, 8.1 parts of 37% aqueous formalin was mixed with 2.5 parts of aqueous solution containing 8.0 parts of sodium hydroxide, and added dropwise thereto over 30 minutes using a dropping funnel. The resultant system was allowed to react for 4 hours at 70° C. The reaction mixture was cooled, and then poured into a large amount of acetone to obtain precipitates.

A solid matter obtained by concentrating said precipitates and water-acetone soluble portion was 17.5 parts. As the result of an IR spectrum analysis thereof, it was found that the reaction product thus obtained was disodium imino-diacetate which was clearly different from the objective compound.

COMPARISON EXAMPLE 2

COMPARISON EXAMPLE (*) FOR REACTING DIRECTLY NOVOLAK RESIN WITH IMINODIACETIC ACID

A reaction vessel was charged with 130 parts of phenol, 220 parts of 37% aqueous formaldeyhyde, and 0.8 parts of oxalic acid, and heated gradually from room temperature. The resultant system was allowed to react for 1 hour at a refluxing temperature (90°–100° C), and after adding 0.5 parts of hydrochloric acid thereto, the reaction thereof was continued for 1 hour. Then, 50 parts of water was added thereto and the temperature of the resulting mixture was reduced. After adding 66 parts of acetic acid, 48 parts of 37% aqueous formalin, and further 18 parts of hydrochloric acid thereto, the resultant mixture was heated again and allowed to react for 2 hours at a temperature of 90° to 110° C. The reaction mixture was cooled to separate a resin composition. After removing water therefrom, said resin composition was dehydrated for about 2 hours at normal pressure until the temperature of said resin composition became 120° c. The so obtained resin was pulverized, subjected to a cross-linking treatment with hydrochloric acid-formalin and then neutralized. When the resultant resin was shaken in an aqueous solution of cadmium in an amount of 50 ppm, the amount of cadmium adsorbed on the resin was 0.27 milliequivalent per gram.

(*) Conventional commercially available or synthetically finished novolak resin (prior to cross-linking) was insoluble in an aqueous acid solution. Hence, an intermediate in the novolak resin-synthesis was allowed to react with the inimodiacetic acid.

While the invention has been described in detail and with reference to specific embodiments thereof, it will be apparent to one skilled in the art that various changes and modifications can be made therein without departing from the spirit and scope thereof.

What is claimed is:

1. A high adsorption capacity phenolic chelate resin consisting of a heavy metal-adsorbing phenolic chelate resin having an adsorbability to a heavy metal in the proportion of at least 1.2 milliequivalents per g. of dried terminal Na type resin, said phenolic chelate resin being prepared from at least one phenol, at least one aldehyde and iminodiacetic acid, said iminodiacetic acid being used in the ratio of more than 0.2 based on the total phenol.

2. The resin as claimed in claim 1, wherein said adsorbability to a heavy metal is at least 1.4 m equivalent per g. of dried terminal Na type resin..

3. The resin as claimed in claim 1, wherein said resin is a bead having a diameter of at least 2 mm.

4. A process for producing the bead-like resin as claimed in claim 3 which comprises the steps, in combination, (a) heating an acid mixture of phenols, aldehydes and iminodiacetic acid at a temperature of 20° to 90° C to introduce the iminodiacetic acid into the phenols, and (b) adding phenols and/or aldehydes thereto, conducting the polycondensation thereof in the presence of an acid catalyst, dispersing the reaction solution into a medium while said reaction solution is maintained in a fluidity, and then completing the polycondensation reaction thereof in a supension form.

5. The resin as claimed in claim 1, wherein said phenol is phenol, an alkyl-substituted phenol, a polyhydric phenol or a compound containing a phenolic hydroxyl group.

6. The resin as claimed in Claim 5, wherein said phenol is phenol, o-ethylphenol, m-ethylphenol, p-ethylphenol, p-phenylphenol, bisphenol A, o-cresol, m-cresol, p-cresol, 2,3-xylenol, 2,5-xylenol, 3,4-xylenol, 3,5-xylenol, resorcinol, catechal, or α-naphtol.

7. The resin as claimed in claim 1, wherein said aldehyde is formaldehyde, para-formaldehyde, hexamethylenetetramine, acetaldehyde, propionaldehyde, benzaldehyde or furfural.

* * * * *